US012545859B2

(12) United States Patent
Lant et al.

(10) Patent No.: US 12,545,859 B2
(45) Date of Patent: Feb. 10, 2026

(54) FABRIC TREATMENT USING BACTERIAL SPORES

(71) Applicant: The Procter & Gamble Company, Cincinnati, OH (US)

(72) Inventors: Neil Joseph Lant, Newcastle Upon Tyne (GB); Samuel Kimani Njoroge, Montgomery, OH (US); Todd Michael Wernicke, Cincinnati, OH (US); Julie Marie Porter, Amelia, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 858 days.

(21) Appl. No.: 17/829,454

(22) Filed: Jun. 1, 2022

(65) Prior Publication Data

US 2023/0058174 A1 Feb. 23, 2023

(30) Foreign Application Priority Data

Jul. 19, 2021 (EP) .................................... 21186306

(51) Int. Cl.

| | |
|---|---|
| ***C11D 3/00*** | (2006.01) |
| ***C11D 3/37*** | (2006.01) |
| ***C11D 3/38*** | (2006.01) |
| ***C11D 17/06*** | (2006.01) |

(52) U.S. Cl.

CPC ............ *C11D 3/381* (2013.01); *C11D 3/0068* (2013.01); *C11D 3/3707* (2013.01); *C11D 17/06* (2013.01); *C11D 2111/12* (2024.01)

(58) Field of Classification Search

CPC ...................................................... C11D 3/381
USPC .......................................................... 435/263
See application file for complete search history.

(56) References Cited

U.S. PATENT DOCUMENTS

| | | | |
|---|---|---|---|
| 11,959,048 B2 | 4/2024 | Njoroge | |
| 2015/0125417 A1 | 5/2015 | Mchatton et al. | |
| 2019/0078040 A1 | 3/2019 | Kandzia et al. | |
| 2020/0002885 A1* | 1/2020 | Langevin | C08F 271/00 |
| 2021/0032570 A1* | 2/2021 | Lindsay | C11D 3/38636 |
| 2021/0130737 A1 | 5/2021 | Njoroge et al. | |
| 2022/0195347 A1* | 6/2022 | Gianolla | C11D 3/381 |
| 2023/0220307 A1* | 7/2023 | Kellar | C11D 3/381 435/264 |

FOREIGN PATENT DOCUMENTS

| | | | |
|---|---|---|---|
| EP | 3819361 A1 | 5/2021 | |
| WO | WO-2020008053 A1 * | 1/2020 | C11D 3/381 |
| WO | 2021092615 A1 | 5/2021 | |
| WO | 2021094091 A1 | 5/2021 | |

OTHER PUBLICATIONS

GWMWater, "How much water you use", <https://www.gwmwater.org.au/conserving-water/saving-water/how-much-water-you-use>, cached by Internet Archive Mar. 8, 2020 (Year: 2020).*

Cotton et al., Improved garment longevity and reduced microfibre release are important sustainability benefits of laundering in colder and quicker washing machine cycles, Dyes and Pigments 177, available online Dec. 10, 2019. (Year: 2019).*

CM05352 PCT Search Report and Written Opinion for PCT/US2022/031676 dated Sep. 2, 2022, 11 pages.

Extended European Search Report and Search Opinion: Application No 21186306.3; dated Jan. 4, 2022; 6 pages.

* cited by examiner

*Primary Examiner* — Holly Kipouros
(74) *Attorney, Agent, or Firm* — George H. Leal

(57) ABSTRACT

A method of treating a fabric in a washing machine using a cold and/or a quick program, including contacting the fabric with a treatment liquor comprising at least $1\times10^2$ CFU/l of liquor, of bacterial spores wherein the cold program includes a wash having a bath temperature below 30° C. and/or the quick program lasts less than 40 minutes.

18 Claims, No Drawings

FABRIC TREATMENT USING BACTERIAL SPORES

FIELD OF THE INVENTION

The present application relates to a method of treating a fabric to provide malodor reduction and/or malodor prevention.

BACKGROUND OF THE INVENTION

Malodor is a growing problem, particularly in laundry, with the changed habits of lower temperature and shorter washing programs.

There is a need for an environmentally friendly, low-energy consumption laundry process that helps to combat malodor of fabrics.

SUMMARY OF THE INVENTION

According to the present application, there is provided a method of treating a fabric in a washing machine using a cold and/or quick program, preferably a cold and quick program. The method comprises the treatment step of contacting the fabric with a treatment liquor. The treatment liquor comprises at least $1\times10^2$ CFU/liter of the liquor, preferably from about $1\times10^2$ to about $1\times10^8$ CFU/liter of the liquor, more preferably from about $1\times10^4$ to about $1\times10^7$ CFU/liter of the liquor of bacterial spores. By "cold program" is herein understood a program having a wash bath temperature below 30° C., preferably below about 25° C., more preferably below about 22° C. By "quick program" is herein understood a program lasting less than 40 minutes, preferably less than about 30 minutes and more preferably less than 28 minutes.

The method provides sustained malodor removal and/or malodor prevention from fabrics over an extended period of time.

DETAILED DESCRIPTION OF THE INVENTION

The present application encompasses a method of treating a fabric in a washing machine using a cold and/or a quick program. The method comprises the step of contacting the fabric with a treatment liquor comprising at least $1\times10^2$ CFU/liter of the liquor, preferably from about $1\times10^2$ to about $1\times10^8$ CFU/liter of the liquor, preferably from about $1\times10^4$ to about $1\times10^7$ CFU/liter of the liquor, of bacterial spores, preferably *Bacillus* spores.

In a preferred embodiment the method uses a cold cycle and the length of the program is no more than 60 minutes.

It has been generally believed that laundry processes are more effective when conducted a high temperature and having a long washing time however, during the course of this work it has been surprisingly found that cold and/or quick laundry processes can provide better sustained malodor removal and prevention that laundry processed performed at higher temperatures and having longer washing times.

By "sustained malodor removal" is meant that the malodor removal and/or prevention takes place for at least 24 hours, preferably for at least 48 hours after the fabric has been treated. Without being bound by theory it is believed that the bacterial spores germinate with external stimulus such as heat and sweat from the user, thereby producing malodor removal and prevention during the wearing of the fabric.

As used herein, the articles "a" and "an" when used in a claim, are understood to mean one or more of what is claimed or described. As used herein, the terms "include," "includes," and "including" are meant to be non-limiting. The compositions of the present disclosure can comprise, consist essentially of, or consist of, the components of the present disclosure.

All percentages, ratios and proportions used herein are by weight percent of the composition, unless otherwise specified. All average values are calculated "by weight" of the composition, unless otherwise expressly indicated. All ratios are calculated as a weight/weight level, unless otherwise specified.

All measurements are performed at 25° C. unless otherwise specified.

Unless otherwise noted, all component or composition levels are in reference to the active portion of that component or composition, and are exclusive of impurities, for example, residual solvents or by-products, which may be present in commercially available sources of such components or compositions.

Method of Treating a Surface

The present disclosure relates to a method of treating a fabric using bacterial spores, preferably the bacterial spores comprise *Bacillus* spores.

The method of the present disclosure includes contacting a fabric with an aqueous treatment liquor. The aqueous treatment liquor comprises at least $1\times10^2$ CFU/liter of the liquor, preferably from about $1\times10^2$ to about $1\times10^8$ CFU/liter of the liquor, preferably from about $1\times10^4$ to about $1\times10^7$ CFU/liter of the liquor, of bacterial spores, preferably *Bacillus* spores.

The method of treating the fabric takes place in an automatic washing machine. Such machines may be top-loading machines or front-loading machines. Preferably the program of the method of the invention uses no more than 65 liters of water, more preferably no more than 60 liters of water, more preferably no more than 50 liters of water and even more preferably no more than 40 liters of water.

The treatment step may be part of a wash or a rinse cycle of a program in an automatic washing machine. The treatment liquor may be a rinse liquor. A composition comprising bacterial spores may be added to the drawer or drum of an automatic washing machine during a wash or a rinse cycle to form the treatment liquor.

The treatment step of the method of the present disclosure includes contacting the fabric with an aqueous wash liquor. The step of contacting the fabric with the aqueous wash liquor may occur prior to contacting the fabric with an aqueous rinse liquor. Such steps may occur during a single treatment cycle. The aqueous wash liquor may comprise a cleaning composition, such as a granular or liquid laundry detergent composition, that is dissolved or diluted in water. The detergent composition may include anionic surfactant. The aqueous wash liquor may comprise from about 50 to about 5000 ppm, or from about 100 to about 1000 ppm, anionic surfactant.

The method of invention can comprise a laundry process comprising a wash and a rinse cycle and wherein the bacterial spores can be delivered to the fabric from a cleaning composition and/or from an additive composition. The bacterial spores may be delivered into the wash cycle or the rinse cycle, preferably into the wash cycle.

Composition for Use in the Method of the Invention

The composition used in the method of the invention is herein sometimes referred to as “the composition of the invention”.

As used herein the phrase “fabric treatment composition” includes compositions designed for treating fabric, including garments, or other textiles.

Such compositions may include but are not limited to, laundry cleaning compositions and detergents, fabric freshening compositions, laundry prewash, laundry pretreat, laundry additives, spray products, dry cleaning agent or composition, laundry rinse additive, wash additive, post-rinse fabric treatment, ironing aid, unit dose formulation, delayed delivery formulation, detergent contained on or in a porous substrate or nonwoven sheet, and other suitable forms that may be apparent to one skilled in the art in view of the teachings herein. Such compositions may be used as a pre-laundering treatment, a post-laundering treatment, or may be added during the wash and/or rinse cycle of the laundering process.

The composition may be in any suitable form. It may be in the form of a liquid composition, a granular composition, a single-compartment pouch, a multi-compartment pouch, a sheet, a pastille or bead, a fibrous article, a tablet, a bar, flake, or a mixture thereof. The composition can be selected from a liquid, solid, or combination thereof.

The composition may be in liquid form. The composition may include from about 30% to about 90%, or from about 50% to about 80%, by weight of the composition, of water. The pH of the composition may be optimized to facilitate bacterial spores stability.

The composition may be a cleaning or additive composition, it may be in the form of a unitized dose article, such as a tablet, a pouch, a sheet, or a fibrous article. Such pouches typically include a water-soluble film, such as a polyvinyl alcohol water-soluble film, that at least partially encapsulates a composition. Suitable films are available from MonoSol, LLC (Indiana, USA).

The composition can be encapsulated in a single or multi-compartment pouch. A multi-compartment pouch may have at least two, at least three, or at least four compartments. A multi-compartmented pouch may include compartments that are side-by-side and/or superposed. The composition contained in the pouch or compartments thereof may be liquid, solid (such as powders), or combinations thereof. Pouched compositions may have relatively low amounts of water, for example less than about 20%, or less than about 15%, or less than about 12%, or less than about 10%, or less than about 8%, by weight of the detergent composition, of water.

The composition may be in the form of a pastille or bead. The pastille may include polyethylene glycol as a carrier. The polyethylene glycol may have a weight average molecular weight of from about 2000 to about 20,000 Daltons, preferably from about 5000 to about 15,000 Daltons, more preferably from about 6000 to about 12,000 Daltons.

The composition may comprise a non-aqueous solvent, which may act as a carrier and/or facilitate stability. Non-aqueous solvents may include organic solvents, such as methanol, ethanol, propanol, isopropanol, 1,3-propanediol, 1,2-propanediol, ethylene glycol, glycerine, glycol ethers, hydrocarbons, or mixtures thereof. Other non-aqueous solvents may include lipophilic fluids such as siloxanes or other silicones, hydrocarbons, perfluorinated amines, perfluorinated and hydrofluoroether solvents, or mixtures thereof. Amine-containing solvents, such as monoethanolamine, diethanolamine and triethanolamine, may be suitable.

Bacterial Spores

Although bacterial spores can be present on surfaces, the method of the invention involves the intentional addition of bacterial spores to the fabric surface in an amount capable of providing a consumer noticeable benefit, in particular malodor removal and prevention benefit. Preferably, the method of the invention requires the intentional addition of at least $1\times10^2$ CFU/g, preferably from $1\times10^2$ CFU/g of surface to $1\times10^4$ CFU/g of surface. By “intentional addition of bacterial spores” is herein meant that the spores are added in addition to the microorganisms that might be present on the surface.

The microbial spores used in the method and use of the invention can be added to a wash or rinse cycle. The spores are fabric-substantive and provide malodor control after the laundry process, in particular during and after the use (e.g. wearing) of the fabrics.

The microbial spores of the method of the invention can germinate on fabrics. The spores can be activated by heat, for example, heat generated during use of the fabric. The spores can germinate when the fabrics are stored and/or used. Malodor precursors can be used by the bacteria produced by the spores as nutrients promoting germination.

The bacterial spores for use herein: i) are capable of surviving the temperatures found in a laundry process; ii) are fabric substantive; iii) have the ability to control odor; and iv) preferably have the ability to support the cleaning action of laundry detergents. The spores have the ability to germinate and to form cells during the treatment and continue to germinate and form cells on the fabrics using malodor precursors as nutrients. The spores can be delivered in liquid or solid form. Preferably, the spores are in solid form.

Some gram-positive bacteria have a two-stage lifecycle in which growing bacteria under certain conditions such as in response to nutritional deprivation can undergo an elaborate developmental program leading to spores or endospores formation. The bacterial spores are protected by a coat consisting of about 60 different proteins assembled as a biochemically complex structure with intriguing morphological and mechanical properties. The protein coat is considered a static structure that provides rigidity and mainly acting as a sieve to exclude exogenous large toxic molecules, such as lytic enzymes. Spores play critical roles in long term survival of the species because they are highly resistant to extreme environmental conditions. Spores are also capable of remaining metabolically dormant for years. Methods for obtaining bacterial spores from vegetative cells are well known in the field. In some examples, vegetative bacterial cells are grown in liquid medium. Beginning in the late logarithmic growth phase or early stationary growth phase, the bacteria may begin to sporulate. When the bacteria have finished sporulating, the spores may be obtained from the medium, by using centrifugation for example. Various methods may be used to kill or remove any remaining vegetative cells. Various methods may be used to purify the spores from cellular debris and/or other materials or substances. Bacterial spores may be differentiated from vegetative cells using a variety of techniques, like phase-contrast microscopy, automated scanning microscopy, high resolution atomic force microscopy or tolerance to heat, for example. Because bacterial spores are generally environmentally-tolerant structures that are metabolically inert or dormant, they are readily chosen to be used in commercial microbial products. Despite their ruggedness and extreme longevity, spores can rapidly respond to the presence of small specific molecules known as germinants that signal favorable conditions for breaking dormancy through germination, an initial step in the process of completing the lifecycle by returning to vegetative bacteria. For example, the commercial microbial products may be designed to be dispersed into an environment where the spores encounter the germinants present in the environment to germinate into vegetative cells and perform an intended function. A variety of different bacteria may form spores. Bacteria from any of these groups may be used in the compositions, methods, and kits disclosed herein. For example, some bacteria of the following genera may form spores: *Acetonema, Alkalibacillus, Ammoniphilus, Amphibacillus, Anaerobacter, Anaerospora, Aneurinibacillus, Anoxybacillus, Bacillus, Brevibacillus, Caldanaerobacter, Caloramator, Caminicella, Cerasibacillus, Clostridium, Clostridiisalibacter, Cohnella, Dendrosporobacter, Desulfotomaculum, Desulfosporomusa, Desulfosporosinus, Desulfovirgula, Desulfunispora, Desulfurispora, Filifactor, Filobacillus, Gelria, Geobacillus, Geosporobacter, Gracilibacillus, Halonatronum, Heliobacterium, Heliophilum, Laceyella, Lentibacillus, Lysinibacillus, Mahella, Metabacterium, Moorella, Natroniella, Oceanobacillus, Orenia, Ornithinibacillus, Oxalophagus, Oxobacter, Paenibacillus, Paraliobacillus, Pelospora, Pelotomaculum, Piscibacillus, Planifilum, Pontibacillus, Propionispora, Salinibacillus, Salsuginibacillus, Seinonella, Shimazuella, Sporacetigenium, Sporoanaerobacter, Sporobacter, Sporobacterium, Sporohalobacter, Sporolactobacillus, Sporomusa, Sporosarcina, Sporotalea, Sporotomaculum, Syntrophomonas, Syntrophospora, Tenuibacillus, Tepidibacter, Terribacillus, Thalassobacillus, Thermoacetogenium, Thermoactinomyces, Thermoalkalibacillus, Thermoanaerobacter, Thermoanaeromonas, Thermobacillus, Thermoflavimicrobium, Thermovenabulum, Tuberibacillus, Virgibacillus*, and/or *Vulcanobacillus*.

Preferably, the bacteria that may form spores are from the family Bacillaceae, such as species of the genera *Aeribacillus, Aliibacillus, Alkalibacillus, Alkalicoccus, Alkalihalobacillus, Alkalilactibacillus, Allobacillus, Alteribacillus, Alteribacter, Amphibacillus, Anaerobacillus, Anoxybacillus, Aquibacillus, Aquisalibacillus, Aureibacillus, Bacillus, Caldalkalibacillus, Caldibacillus, Calditerricola, Calidifontibacillus, Camelliibacillus, Cerasibacillus, Compostibacillus, Cytobacillus, Desertibacillus, Domibacillus, Ectobacillus, Evansella, Falsibacillus, Ferdinandcohnia, Fermentibacillus, Fictibacillus, Filobacillus, Geobacillus, Geomicrobium, Gottfriedia, Gracilibacillus, Halalkalibacillus, Halobacillus, Halolactibacillus, Heyndrickxia, Hydrogenibacillus, Lederbergia, Lentibacillus, Litchfieldia, Lottiidibacillus, Margalitia, Marinococcus, Melghiribacillus, Mesobacillus, Metabacillus, Microaerobacter, Natribacillus, Natronobacillus, Neobacillus, Niallia, Oceanobacillus, Ornithinibacillus, Parageobacillus, Paraliobacillus, Paralkalibacillus, Paucisalibacillus, Pelagirhabdus, Peribacillus, Piscibacillus, Polygonibacillus, Pontibacillus, Pradoshia, Priestia, Pseudogracilibacillus, Pueribacillus, Radiobacillus, Robertmurraya, Rossellomorea, Saccharococcus, Salibacterium, Salimicrobium, Salinibacillus, Salipaludibacillus, Salirhabdus, Salisediminibacterium, Saliterribacillus, Salsuginibacillus, Sediminibacillus, Siminovitchia, Sinibacillus, Sinobaca, Streptohalobacillus, Sutchffiella, Swionibacillus, Tenuibacillus, Tepidibacillus, Terribacillus, Terrilactibacillus, Texcoconibacillus, Thalassobacillus, Thalassorhabdus, Thermolongibacillus, Virgibacillus, Viridibacillu, Vulcanibacillus, Weizmannia.* In various examples, the bacteria may be strains *of Bacillus Bacillus acidicola, Bacillus aeolius, Bacillus aerius, Bacillus aerophilus, Bacillus albus, Bacillus altitudinis, Bacillus alveayuensis, Bacillus amyloliquefaciensex, Bacillus anthracis, Bacillus aquiflavi, Bacillus atrophaeus, Bacillus australimaris, Bacillus badius, Bacillus benzoevorans, Bacillus cabrialesii, Bacillus canaveralius, Bacillus capparidis, Bacillus carboniphilus, Bacillus cereus, Bacillus chungangensis, Bacillus coahuilensis, Bacillus cytotoxicus, Bacillus decisifrondis, Bacillus ectoiniformans, Bacillus enclensis, Bacillus fengqiuensis, Bacillus fungorum, Bacillus glycinifermentans, Bacillus gobiensis, Bacillus halotolerans, Bacillus haynesii, Bacillus horti, Bacillus inaquosorum, Bacillus infantis, Bacillus infernus, Bacillus isabeliae, Bacillus kexueae, Bacillus lichenformis, Bacillus luti, Bacillus manusensis, Bacillus marinisedimentorum, Bacillus mesophilus, Bacillus methanolicus, Bacillus mobilis, Bacillus mojavensis, Bacillus mycoides, Bacillus nakamurai, Bacillus ndiopicus, Bacillus nitratireducens, Bacillus oleivorans, Bacillus pacificus, Bacillus pakistanensis, Bacillus paralichenformis, Bacillus paramycoides, Bacillus paranthracis, Bacillus pervagus, Bacillus piscicola, Bacillus proteolyticus, Bacillus pseudomycoides, Bacillus pumilus, Bacillus safensis, Bacillus salacetis, Bacillus salinus, Bacillus salitolerans, Bacillus seohaeanensis, Bacillus shivajii, Bacillus siamensis, Bacillus smithii, Bacillus solimangrovi, Bacillus songklensis, Bacillus sonorensis, Bacillus spizizenii, Bacillus spongiae, Bacillus stercoris, Bacillus stratosphericus, Bacillus subtilis, Bacillus swezeyi, Bacillus taeanensis, Bacillus tamaricis, Bacillus tequilensis, Bacillus thermocloacae, Bacillus thermotolerans, Bacillus thuringiensis, Bacillus tianshenii, Bacillus toyonensis, Bacillus tropicus, Bacillus vallismortis, Bacillus velezensis, Bacillus wiedmannii, Bacillus wudalianchiensis, Bacillus xiamenensis, Bacillus xiapuensis, Bacillus zhangzhouensis*, or combinations thereof.

In some examples, the bacterial strains that form spores may be strains of *Bacillus*, including: *Bacillus* sp. strain SD-6991; *Bacillus* sp. strain SD-6992; *Bacillus* sp. strain NRRL B-50606; *Bacillus* sp. strain NRRL B-50887; *Bacillus pumilus* strain NRRL B-50016; *Bacillus amyloliquefaciens* strain NRRL B-50017; *Bacillus amyloliquefaciens* strain PTA-7792 (previously classified as *Bacillus atrophaeus*); *Bacillus amyloliquefaciens* strain PTA-7543 (previously classified as *Bacillus atrophaeus*); *Bacillus amyloliquefaciens* strain NRRL B-50018; *Bacillus amyloliquefaciens* strain PTA-7541; *Bacillus amyloliquefaciens* strain PTA-7544; *Bacillus amyloliquefaciens* strain PTA-7545; *Bacillus amyloliquefaciens* strain PTA-7546; *Bacillus subtilis* strain PTA-7547; *Bacillus amyloliquefaciens* strain PTA-7549; *Bacillus amyloliquefaciens* strain PTA-7793; *Bacillus amyloliquefaciens* strain PTA-7790; *Bacillus amyloliquefaciens* strain PTA-7791; *Bacillus subtilis* strain NRRL B-50136 (also known as DA-33R, ATCC accession No. 55406); *Bacillus amyloliquefaciens* strain NRRL B-50141; *Bacillus amyloliquefaciens* strain NRRL B-50399; *Bacillus* lichenformis strain NRRL B-50014; *Bacillus* lichenformis strain NRRL B-50015; *Bacillus amyloliquefaciens* strain NRRL B-50607; *Bacillus subtilis* strain NRRL B-50147 (also known as 300R); *Bacillus amyloliquefaciens* strain NRRL B-50150; *Bacillus amyloliquefaciens* strain NRRL B-50154; *Bacillus megaterium* PTA-3142; *Bacillus amyloliquefaciens* strain ATCC accession No. 55405 (also known as 300); *Bacillus amyloliquefaciens* strain ATCC accession No. 55407 (also known as PMX); *Bacillus pumilus* NRRL B-50398 (also known as ATCC 700385, PMX-1, and NRRL B-50255); *Bacillus cereus* ATCC accession No. 700386; *Bacillus thuringiensis* ATCC accession No. 700387 (all of the above strains are available from Novozymes, Inc., USA); *Bacillus amyloliquefaciens* FZB24 (e.g., isolates NRRL B-50304 and NRRL B-50349 TAEGRO® from Novozymes), *Bacillus subtilis* (e.g., isolate NRRL B-21661 in RHAPSODY®, SERENADE® MAX and SERENADE® ASO from Bayer CropScience), *Bacillus pumilus* (e.g., isolate NRRL B-50349 from Bayer CropScience), *Bacillus amyloliquefaciens* TrigoCor (also known as "TrigoCor 1448"; e.g., isolate Embrapa Trigo Accession No. 144/88.4Lev, Cornell Accession No. Pma007BR-97, and ATCC accession No. 202152, from Cornell University, USA) and combinations thereof.

In some examples, the bacterial strains that form spores may be strains of *Bacillus amyloliquefaciens*. For example, the strains may be *Bacillus amyloliquefaciens* strain PTA-7543 (previously classified as *Bacillus atrophaeus*), and/or *Bacillus amyloliquefaciens* strain NRRL B-50154, *Bacillus amyloliquefaciens* strain PTA-7543 (previously classified as *Bacillus atrophaeus*), *Bacillus amyloliquefaciens* strain NRRL B-50154, or from other *Bacillus amyloliquefaciens* organisms.

In some examples, the bacterial strains that form spores may be *Brevibacillus* spp., e.g., *Brevibacillus brevis; Brevibacillus formosus; Brevibacillus laterosporus*; or *Brevibacillus parabrevis*, or combinations thereof.

In some examples, the bacterial strains that form spores may be *Paenibacillus* spp., e.g., *Paenibacillus alvei; Paenibacillus amylolyticus; Paenibacillus azotofixans; Paenibacillus cookii; Paenibacillus macerans; Paenibacillus polymyxa; Paenibacillus validus*, or combinations thereof. The bacterial spores may have an average particle diameter of about 2-50 microns, suitably about 10-45 microns. *Bacillus* spores are commercially available in blends in aqueous carriers and are insoluble in the aqueous carriers. Other commercially available *bacillus* spore blends include without limitation Freshen Free™ CAN (10×), available from Novozymes Biologicals, Inc.; Evogen® Renew Plus (10×), available from Genesis Biosciences, Inc.; and Evogen® GT (10×, 20× and 110×), all available from Genesis Biosciences, Inc. In the foregoing list, the parenthetical notations (10×, 20×, and 110×) indicate relative concentrations of the *Bacillus* spores.

Bacterial spores used in the method and composition disclosed herein may or may not be heat activated. In some examples, the bacterial spores are heat activated. In some examples, the bacterial spores are not heat inactivated. Preferably, the spores used herein are heat activated. Heat activation may comprise heating bacterial spores from room temperature (15-25° C.) to optimal temperature of between 25-120° C., preferably between 40 C-100° C., and held the optimal temperature for not more than 2 hours, preferably between 70-80° C. for 30 min.

For the methods, compositions and products disclosed herein, populations of bacterial spores are generally used. In some examples, a population of bacterial spores may include bacterial spores from a single strain of bacterium. Preferably, a population of bacterial spores may include bacterial spores from 2, 3, 4, 5, or more strains of bacteria. Generally, a population of bacterial spores contains a majority of spores and a minority of vegetative cells. In some examples, a population of bacterial spores does not contain vegetative cells. In some examples, a population of bacterial spores may contain less than about 1%, 2%, 3%, 4%, 5%, 6%, 7%, 8%, 9%, 10%, 15%, 20%, 25%, 30%, 40%, or 50% vegetative cells, where the percentage of bacterial spores is calculated as ((vegetative cells/(spores in population+vegetative cells in population))×100).

Generally, populations of bacterial spores used in the disclosed methods, compositions and products are stable (i.e. not undergoing germination), with at least some individual spores in the population capable of germinating.

Populations of bacterial spores used in this disclosure may contain bacterial spores at different concentrations. In various examples, populations of bacterial spores may contain, without limitation, at least $1\times10^2$, $5\times10^2$, $1\times10^3$, $5\times10^3$, $1\times10^4$, $5\times10^4$, $1\times10^5$, $5\times10^5$, $1\times10^6$, $5\times10^6$, $1\times10^7$, $5\times10^7$, $1\times10^8$, $5\times10^8$, $1\times10^9$, $5\times10^9$, $1\times10^{10}$, $5\times10^{10}$, $1\times10^{11}$, $5\times10^{11}$, $1\times10^{12}$, $5\times10^{12}$, $1\times10^{13}$, $5\times10^{13}$, $1\times10^{14}$, or $5\times10^{14}$ spores/ml, spores/gram, or spores/$cm^3$.

Suitable cleaning ingredients include at least one of a surfactant, an enzyme, an enzyme stabilizing system, a detergent builder, a chelating agent, a complexing agent, clay soil removal/anti-redeposition agents, polymeric soil release agents, polymeric dispersing agents, polymeric grease cleaning agents, a dye transfer inhibiting agent, a bleaching agent, a bleach activator, a bleaching catalyst, a fabric conditioner, a clay, a foam booster, an anti-foam, a suds suppressor, an anti-corrosion agent, a soil-suspending agent, a dye, a hueing dye, a bactericide, a tarnish inhibitor, an optical brightener, a perfume, a saturated or unsaturated fatty acid, a calcium cation, a magnesium cation, a visual signaling ingredient, a structurant, a thickener, an anti-caking agent, a starch, sand, a gelling agents, or any combination thereof.

Surfactant System: The composition may comprise a surfactant system in an amount sufficient to provide desired cleaning properties. In some embodiments, the composition comprises, by weight of the composition, from about 1% to about 70% of a surfactant system. In other embodiments, the composition comprises, by weight of the composition, from about 2% to about 60% of the surfactant system. In further embodiments, the composition comprises, by weight of the composition, from about 5% to about 30% of the surfactant system. The surfactant system may comprise a detersive surfactant selected from anionic surfactants, nonionic surfactants, cationic surfactants, zwitterionic surfactants, amphoteric surfactants, ampholytic surfactants, and mixtures thereof. Those of ordinary skill in the art will understand that a detersive surfactant encompasses any surfactant or mixture of surfactants that provide cleaning, stain removing, or laundering benefit to soiled material.

Anionic Surfactant. Non-limiting examples of suitable anionic surfactants include any conventional anionic surfactant, such as linear alkylbenzenesulfonate (LAS), alpha-olefinsulfonate (AOS), alkyl sulfate (fatty alcohol sulfate) (AS), alcohol ethoxysulfate (AEOS or AES), secondary alkanesulfonates (SAS), alpha-sulfo fatty acid methyl esters, alkyl- or alkenylsuccinic acid, or soap.

Nonionic surfactant. Suitable nonionic surfactants useful herein can comprise any conventional nonionic surfactant. These can include, for e.g., alkoxylated fatty alcohols and amine oxide surfactants. Other non-limiting examples of nonionic surfactants useful herein include: $C_8$-$C_{18}$ alkyl ethoxylates, such as, NEODOL® nonionic surfactants from Shell; $C_6$-$C_{12}$ alkyl phenol alkoxylates wherein the alkoxylate units may be ethyleneoxy units, propyleneoxy units, or a mixture thereof; $C_{12}$-$C_{18}$ alcohol and $C_6$-$C_{12}$ alkyl phenol condensates with ethylene oxide/propylene oxide block polymers such as Pluronic® from BASF; $C_{14}$-$C_{22}$ mid-chain branched alcohols (BA); $C_{14}$-$C_{22}$ mid-chain branched MEA ($BAE_x$), wherein x is from 1 to 30; alkylpolysaccharides; specifically alkylpolyglycosides; Polyhydroxy fatty acid amides; and ether capped poly(oxyalkylated) alcohol surfactants. Suitable nonionic detersive surfactants also include alkyl polyglucoside and alkyl alkoxylated alcohol. Suitable nonionic surfactants also include those sold under the tradename Lutensol® from BASF.

Cationic Surfactant. The surfactant system may comprise a cationic surfactant. In some aspects, the surfactant system comprises from about 0% to about 7%, or from about 0.1% to about 5%, or from about 1% to about 4%, by weight of the surfactant system, of a cationic surfactant, e.g., as a co-surfactant. In some aspects, the compositions of the invention are substantially free of cationic surfactants and surfactants that become cationic below a pH of 7 or below a pH of 6. Non-limiting examples of cationic surfactants include: the quaternary ammonium surfactants, which can have up to 26 carbon atoms include: alkoxylate quaternary ammonium (AQA) surfactants; dimethyl hydroxyethyl quaternary ammonium; dimethyl hydroxyethyl lauryl ammonium chloride; polyamine cationic surfactants; cationic ester surfactants; and amino surfactants, specifically amido propyldimethyl amine (APA).

Zwitterionic Surfactant. Examples of zwitterionic surfactants include: derivatives of secondary and tertiary amines, derivatives of heterocyclic secondary and tertiary amines, or derivatives of quaternary ammonium, quaternary phosphonium or tertiary sulfonium compounds. Betaines, including alkyl dimethyl betaine and cocodimethyl amidopropyl betaine, $C_8$ to $C_{18}$ (for example from $C_{12}$ to $C_{18}$) amine oxides and sulfo and hydroxy betaines, such as N-alkyl-N, N-dimethylammino-1-propane sulfonate where the alkyl group can be $C_8$ to $C_{18}$ and in certain embodiments from $C_{10}$ to $C_{14}$.

Amphoteric Surfactant. Examples of amphoteric surfactants include aliphatic derivatives of secondary or tertiary amines, or aliphatic derivatives of heterocyclic secondary and tertiary amines in which the aliphatic radical may be straight- or branched-chain and where one of the aliphatic substituents contains at least about 8 carbon atoms, typically from about 8 to about 18 carbon atoms, and at least one of the aliphatic substituents contains an anionic water-solubilizing group, e.g. carboxy, sulfonate, sulfate. Examples of compounds falling within this definition are sodium 3-(dodecylamino)propionate, sodium 3-(dodecylamino) propane-1-sulfonate, sodium 2-(dodecylamino)ethyl sulfate, sodium 2-(dimethylamino) octadecanoate, disodium 3-(N-carboxymethyldodecylamino)propane 1-sulfonate, disodium octadecyl-imminodiacetate, sodium 1-carboxymethyl-2-undecylimidazole, and sodium N,N-bis(2-hydroxyethyl)-2-sulfato-3-dodecoxypropylamine. Suitable amphoteric surfactants also include sarcosinates, glycinates, taurinates, and mixtures thereof.

Enzymes. Preferably the composition comprises one or more enzymes. Preferred enzymes provide cleaning performance and/or fabric care benefits. Examples of suitable enzymes include, but are not limited to, hemicellulases, peroxidases, proteases, cellulases, xylanases, lipases, phospholipases, esterases, cutinases, pectinases, mannanases, galactanases, pectate lyases, keratinases, reductases, oxidases, phenoloxidases, lipoxygenases, ligninases, pullulanases, tannases, pentosanases, malanases, ß-glucanases, arabinosidases, hyaluronidase, chondroitinase, laccase, and amylases, or mixtures thereof. A typical combination is an enzyme cocktail that may comprise, for example, a protease and lipase in conjunction with amylase.

Proteases. Preferably the composition comprises one or more proteases. Suitable proteases include metalloproteases and serine proteases, including neutral or alkaline microbial serine proteases, such as subtilisins (EC 3.4.21.62). Suitable proteases include those of animal, vegetable or microbial origin. In one aspect, such suitable protease may be of microbial origin. The suitable proteases include chemically or genetically modified mutants of the aforementioned suitable proteases. In one aspect, the suitable protease may be a serine protease, such as an alkaline microbial protease or/and a trypsin-type protease. Examples of suitable neutral or alkaline proteases include:

(a) subtilisins (EC 3.4.21.62), especially those derived from *Bacillus*, such as *Bacillus* sp., *B. lentus, B. alkalophilus, B. subtilis, B. amyloliquefaciens, B. pumilus, B. gibsonii*, and *B. akibaii* described in WO2004067737, WO2015091989, WO2015091990, WO2015024739, WO2015143360, U.S. Pat. Nos. 6,312,936 B1, 5,679,630, 4,760,025, DE102006022216A1, DE102006022224A1, WO2015089447, WO2015089441, WO2016066756, WO2016066757, WO2016069557, WO2016069563, WO2016069569.

(b) trypsin-type or chymotrypsin-type proteases, such as trypsin (e.g., of porcine or bovine origin), including the *Fusarium* protease described in WO 89/06270 and the chymotrypsin proteases derived from *Cellumonas* described in WO 05/052161 and WO 05/052146.

(c) metalloproteases, especially those derived from *Bacillus amyloliquefaciens* described in WO07/044993A2; from *Bacillus, Brevibacillus, Thermoactinomyces, Geobacillus, Paenibacillus*, Lysinibacillus or *Streptomyces* spp. Described in WO2014194032, WO2014194054 and WO2014194117; from *Kribella alluminosa* described in WO2015193488; and from *Streptomyces* and Lysobacter described in WO2016075078.

(d) Protease having at least 90% identity to the subtilase from *Bacillus* sp. TY145, NCIMB 40339, described in WO92/17577 (Novozymes A/S), including the variants of this *Bacillus* sp TY145 subtilase described in WO2015024739, and WO2016066757.

Suitable commercially available protease enzymes include those sold under the trade names Alcalase®, Savinase®, Primase®, Durazym®, Polarzyme®, Kannase®, Liquanase®, Liquanase Ultra®, Savinase Ultra®, Ovozyme®, Neutrase®, Everlase® and Esperase® by Novozymes A/S (Denmark); those sold under the tradename Maxatase®, Maxacal®, Maxapem®, Properase®, Purafect®, Purafect Prime®, Purafect Ox®, FN3®, FN4®, Excellase® and Purafect OXP® by Dupont; those sold under the tradename Opticlean® and Optimase® by Solvay Enzymes; and those available from Henkel/Kemira, namely BLAP (sequence shown in FIG. 29 of U.S. Pat. No. 5,352,604), and KAP (*Bacillus alkalophilus* subtilisin with mutations A230V+S256G+S259N) from Kao.

Amylases. Preferably the composition may comprise an amylase. Suitable alpha-amylases include those of bacterial or fungal origin. Chemically or genetically modified mutants (variants) are included. A preferred alkaline alpha-amylase is derived from a strain of *Bacillus*, such as *Bacillus* licheniformis, *Bacillus amyloliquefaciens, Bacillus stearothermophilus, Bacillus subtilis*, or other *Bacillus* sp., such as *Bacillus* sp. NCIB 12289, NCIB 12512, NCIB 12513, DSM 9375 (U.S. Pat. No. 7,153,818) DSM 12368, DSMZ no. 12649, KSM AP1378 (WO 97/00324), KSM K36 or KSM K38 (EP 1,022,334). Preferred amylases include:

(a) variants described in WO 94/02597, WO 94/18314, WO96/23874 and WO 97/43424, (b) variants described in U.S. Pat. No. 5,856,164 and WO99/23211, WO 96/23873, WO00/60060 and WO 06/002643, (c) variants in WO06/002643.

(d) variants in U.S. Pat. No. 6,093,562
(e) variants described in WO 09/149130,
(f) variants in WO2016091688,
(g) variants in WO2014099523;
(h) variants in WO2014164777;
(i) variants in WO2009149271;
(j) Variants of the wild-type amylase from *Bacillus* sp. KSM-K38 with accession number AB051102.

Suitable commercially available alpha-amylases include DURAMYL®, LIQUEZYME®, TERMAMYL®, TERMAMYL ULTRA®, NATALASE®, SUPRAMYL®, STAINZYME®, STAINZYME PLUS®, FUNGAMYL® and BAN® (Novozymes A/S, Bagsvaerd, Denmark), KEMZYM® AT 9000 Biozym Biotech Trading GmbH Wehlistrasse 27b A-1200 Wien Austria, RAPIDASE®, PURASTAR®, ENZYSIZE®, OPTISIZE HT PLUS®, POWERASE® and PURASTAR OXAM® (Genencor International Inc., Palo Alto, California) and KAM® (Kao, 14-10 Nihonbashi Kayabacho, 1-chome, Chuo-ku Tokyo 103-8210, Japan). In one aspect, suitable amylases include NATALASE®, STAINZYME® and STAINZYME PLUS® and mixtures thereof.

Lipases. Preferably the composition comprises one or more lipases, including "first cycle lipases" such as those described in U.S. Pat. No. 6,939,702 B1 and US PA 2009/0217464. Preferred lipases are first-wash lipases. The composition may comprise a first wash lipase.

Enzyme Stabilizing System. The composition may optionally comprise from about 0.001% to about 10% by weight of the composition, of an enzyme stabilizing system. The enzyme stabilizing system can be any stabilizing system which is compatible with the detersive enzyme. In the case of aqueous detergent compositions comprising protease, a reversible protease inhibitor, such as a boron compound, including borate, 4-formyl phenylboronic acid, phenylboronic acid and derivatives thereof, or compounds such as calcium formate, sodium formate and 1,2-propane diol may be added to further improve stability.

Builder. The composition may optionally comprise a builder or a builder system. Built cleaning compositions typically comprise at least about 1% builder, based on the total weight of the composition. Liquid cleaning compositions may comprise up to about 10% builder, and in some examples up to about 8% builder, of the total weight of the composition. Granular cleaning compositions may comprise up to about 30% builder, and in some examples up to about 5% builder, by weight of the composition.

Builders selected from aluminosilicates (e.g., zeolite builders, such as zeolite A, zeolite P, and zeolite MAP) and silicates assist in controlling mineral hardness in wash water, especially calcium and/or magnesium, or to assist in the removal of particulate soils from surfaces. Suitable builders may be selected from the group consisting of phosphates, such as polyphosphates (e.g., sodium tri-polyphosphate), especially sodium salts thereof; carbonates, bicarbonates, sesquicarbonates, and carbonate minerals other than sodium carbonate or sesquicarbonate; organic mono-, di-, tri-, and tetracarboxylates, especially water-soluble nonsurfactant carboxylates in acid, sodium, potassium or alkanolammonium salt form, as well as oligomeric or water-soluble low molecular weight polymer carboxylates including aliphatic and aromatic types; and phytic acid. These may be complemented by borates, e.g., for pH-buffering purposes, or by sulfates, especially sodium sulfate and any other fillers or carriers which may be important to the engineering of stable surfactant and/or builder-containing cleaning compositions. Additional suitable builders may be selected from citric acid, lactic acid, fatty acid, polycarboxylate builders, for example, copolymers of acrylic acid, copolymers of acrylic acid and maleic acid, and copolymers of acrylic acid and/or maleic acid, and other suitable ethylenic monomers with various types of additional functionalities. Also suitable for use as builders herein are synthesized crystalline ion exchange materials or hydrates thereof having chain structure and a composition represented by the following general anhydride form: $x(M_2O)\cdot ySiO_2\cdot zM'O$ wherein M is Na and/or K, M' is Ca and/or Mg; y/x is 0.5 to 2.0; and z/x is 0.005 to 1.0.

Alternatively, the composition may be substantially free of builder.

Chelating Agent. The composition may also comprise one or more metal ion chelating agents. Suitable molecules include copper, iron and/or manganese chelating agents and mixtures thereof. Such chelating agents can be selected from the group consisting of phosphonates, amino carboxylates, amino phosphonates, succinates, polyfunctionally-substituted aromatic chelating agents, 2-pyridinol-N-oxide compounds, hydroxamic acids, carboxymethyl inulins, and mixtures therein. Chelating agents can be present in the acid or salt form including alkali metal, ammonium, and substituted ammonium salts thereof, and mixtures thereof.

Additional Amines: Additional amines may be used in the composition for added removal of grease and particulates from soiled materials. The compositions may comprise from about 0.1% to about 10%, in some examples, from about 0.1% to about 4%, and in other examples, from about 0.1% to about 2%, by weight of the cleaning composition, of additional amines. Non-limiting examples of additional amines may include, but are not limited to, polyamines, oligoamines, triamines, diamines, pentamines, tetraamines, or combinations thereof. Specific examples of suitable additional amines include tetraethylenepentamine, triethylenetetraamine, diethylenetriamine, or a mixture thereof.

Dye Transfer Inhibiting Agent. The composition can further comprise one or more dye transfer inhibiting agents. Suitable dye transfer inhibiting agents include, for example, polyvinylpyrrolidone polymers, polyamine N-oxide polymers, copolymers of N-vinylpyrrolidone and N-vinylimidazole, polyvinyloxazolidones, polyvinylimidazoles, manganese phthalocyanine, peroxidases, polyvinylpyrrolidone polymers, ethylene-diamine-tetraacetic acid (EDTA); diethylene triamine penta methylene phosphonic acid (DTPMP); hydroxy-ethane diphosphonic acid (HEDP); ethylenediamine N,N'-disuccinic acid (EDDS); methyl glycine diacetic acid (MGDA); diethylene triamine penta acetic acid (DTPA); propylene diamine tetraacetic acid (PDT A); 2-hydroxypyridine-N-oxide (HPNO); or methyl glycine diacetic acid (MGDA); glutamic acid N,N-diacetic acid (N,N-dicarboxymethyl glutamic acid tetrasodium salt (GLDA); nitrilotriacetic acid (NTA); 4,5-dihydroxy-m-benzenedisulfonic acid; citric acid and any salts thereof; N-hydroxyethylethylenediaminetri-acetic acid (HEDTA), triethylenetetraaminehexaacetic acid (TTHA), N-hydroxyethyliminodiacetic acid (HEIDA), dihydroxyethylglycine (DHEG), ethylenediaminetetrapropionic acid (EDTP) and derivatives thereof or a combination thereof.

Bleaching Compounds, Bleaching Agents, Bleach Activators, and Bleach Catalysts. The compositions described herein may comprise bleaching agents, bleach activators and/or bleach catalysts. Bleaching ingredients may be present at levels of from about 1% to about 30%, and in some examples from about 5% to about 20%, based on the total weight of the composition. If present, the amount of bleach activator may be from about 0.1% to about 60%, and in some examples from about 0.5% to about 40%, of the composition.

Examples of bleaching agents include oxygen bleach, perborate bleach, percarboxylic acid bleach and salts thereof, peroxygen bleach, persulfate bleach, percarbonate bleach, and mixtures thereof.

In some examples, compositions may also include a transition metal bleach catalyst.

Bleaching agents other than oxygen bleaching agents are also known in the art and can be utilized in composition. They include, for example, photoactivated bleaching agents, or pre-formed organic peracids, such as peroxycarboxylic acid or salt thereof, or a peroxysulphonic acid or salt thereof. A suitable organic peracid is phthaloylimidoperoxycaproic acid. If used, the composition will typically comprise from about 0.025% to about 1.25%, by weight of the composition, of such bleaches, and in some examples, of sulfonate zinc phthalocyanine.

Brightener. Optical brighteners or other brightening or whitening agents may be incorporated at levels of from about 0.01% to about 1.2%, by weight of the composition.

Commercial brighteners, which may be used herein, can be classified into subgroups, which include, but are not necessarily limited to, derivatives of stilbene, pyrazoline, coumarin, benzoxazoles, carboxylic acid, methinecyanines, dibenzothiophene-5,5-dioxide, azoles, 5- and 6-membered-ring heterocycles, and other miscellaneous agents.

In some examples, the fluorescent brightener is selected from the group consisting of disodium 4,4'-bis{[4-anilino-6-morpholino-s-triazin-2-yl]-amino}-2,2'-stilbenedisulfonate (brightener 15, commercially available under the tradename Tinopal AMS-GX by Ciba Geigy Corporation), disodium4,4'-bis{[4-anilino-6-(N-2-bis-hydroxyethyl)-s-triazine-2-yl]-amino}-2,2'-stilbenedisulonate (commercially available under the tradename Tinopal UNPA-GX by Ciba-Geigy Corporation), disodium 4,4'-bis{[4-anilino-6-(N-2-hydroxyethyl-N-methylamino)-s-triazine-2-yl]-amino}-2,2'-stilbenedisulfonate (commercially available under the tradename Tinopal 5BM-GX by Ciba-Geigy Corporation). More preferably, the fluorescent brightener is disodium 4,4'-bis{[4-anilino-6-morpholino-s-triazin-2-yl]-amino}-2,2'-stilbenedisulfonate.

The brighteners may be added in particulate form or as a premix with a suitable solvent, for example nonionic surfactant, monoethanolamine, propane diol.

Fabric Hueing Agent. The composition may comprise a fabric hueing agent (sometimes referred to as shading, bluing or whitening agents). Typically, the hueing agent provides a blue or violet shade to fabric. Hueing agents can be used either alone or in combination to create a specific shade of hueing and/or to shade different fabric types. This may be provided for example by mixing a red and green-blue dye to yield a blue or violet shade. Hueing agents may be selected from any known chemical class of dye, including but not limited to acridine, anthraquinone (including polycyclic quinones), azine, azo (e.g., monoazo, disazo, trisazo, tetrakisazo, polyazo), including premetallized azo, benzodifurane and benzodifuranone, carotenoid, coumarin, cyanine, diazahemicyanine, diphenylmethane, formazan, hemicyanine, indigoids, methane, naphthalimides, naphthoquinone, nitro and nitroso, oxazine, phthalocyanine, pyrazoles, stilbene, styryl, triarylmethane, triphenylmethane, xanthenes and mixtures thereof.

Encapsulate. The composition may comprise an encapsulate. The encapsulate may comprises a core, a shell having an inner and outer surface, where the shell encapsulates the core.

Other ingredients. The composition can further comprise silicates. Suitable silicates can include, for example, sodium silicates, sodium disilicate, sodium metasilicate, crystalline phyllosilicates or a combination thereof. In some embodiments, silicates can be present at a level of from about 1% to about 20% by weight, based on the total weight of the composition.

The composition can further comprise other conventional detergent ingredients such as foam boosters, suds suppressors, anti-corrosion agents, soil-suspending agents, anti-soil redeposition agents, dyes, bactericides, tarnish inhibiters, optical brighteners, or perfumes.

The composition can optionally further include saturated or unsaturated fatty acids, preferably saturated or unsaturated $C_{12}$-$C_{24}$ fatty acids; deposition aids, for example, polysaccharides, cellulosic polymers, poly diallyl dimethyl ammonium halides (DADMAC), and co-polymers of DADMAC with vinyl pyrrolidone, acrylamides, imidazoles, imidazolinium halides, and mixtures thereof, in random or block configuration, cationic guar gum, cationic cellulose, cationic starch, cationic polyacylamides or a combination thereof. If present, the fatty acids and/or the deposition aids can each be present at 0.1% to 10% by weight, based on the total weight of the composition.

The composition may optionally include silicone or fatty-acid based suds suppressors; hueing dyes, calcium and magnesium cations, visual signaling ingredients, anti-foam (0.001% to about 4.0% by weight, based on the total weight of the composition), and/or a structurant/thickener (0.01% to 5% by weight, based on the total weight of the composition) selected from the group consisting of diglycerides and triglycerides, ethylene glycol distearate, microcrystalline cellulose, microfiber cellulose, biopolymers, xanthan gum, gellan gum, and mixtures thereof).

Additive Composition

The additive compositions of the present disclosure may include additional adjunct ingredients. Such adjuncts may provide additional treatment benefits to the target fabrics, and/or they may act as stabilization or processing aids to the compositions. Suitable adjuncts may include chelant, perfume, structurant, chlorine scavenger, malodor reduction materials, organic solvents, or mixtures thereof.

EXAMPLES

Example 1: Bacterial Spores—Cold and Quick Vs Regular Full-Scale Washing

TABLE 1

| | | Test 1 | Test 2 | Test 3 | Test 4 | Test 5 | Test 6 | TTW Conc. [ppm or CFUs/L] |
|---|---|---|---|---|---|---|---|---|
| Test Description | Test Type | Inventive 1 Control | Inventive 1 | Inventive 2 Control | Inventive 2 | Std. Test Control | Regular Test | |
| | Wash Cond. | Cold & Quick | | Cold & Regular | | Hot & Regular | | |
| | Wash Temp | 15.5° C./60 F. | 15.5° C./60 F. | 15.5° C./60 F. | 15.5° C./60 F. | 30° C./86 F. | 30° C./86 F. | |
| | Total cycle time | 25 min | 25 min | 40min | 40min | 40 min | 40 min | |
| Product 1 | Tide ® HE Detergent (with no perfume and no dye) | x | x | x | x | x | x | 2360 ppm |
| Product 2 | Spore Beads (99.9% PEG8000 + 0.01% spore) | — | x | — | x | — | x | $5.5 \times 10^6$ CFUs/L |
| Product 3 | Beads 100% PEG8000, 0.00% spore) | x | — | x | — | x | — | 0 CFUs |
| TTW Concentration [ppm + CFUs/L] | | 2360 ppm + 0 CFUs | 2360 ppm + $5.5 \times 10^6$ CFUs/L | 2360 pp + 0 CFUs | 2360 ppm + $5.5 \times 10^6$ CFUs/L | 2360pp + 0 CFUs | 2360 ppm + $5.5 \times 10^6$ CFUs/L | |

x = Product used in the Test,
CFUs/L = *Bacillus* spores per liter of wash liquor Three products were tested in two combinations to assess the malodor benefit on consumer fabrics in three different wash conditions (cold water 60° F./quick wash-25 min, cold water 60° F./regular wash-40 min, and hot water 86° F./regular wash-40 min). The six (6) tests were created by combining Product 1 with either Product 2 (control test) or Product 3 for the test. All the six (6) tests comprised Product 1 as the regular wash liquid Tide detergent. Product 1 is a P&G commercial laundry detergent (Tide® nil perfume & nil dye) reformulated without perfume or dye and was used in all the tests as follows. Test 1 comprised of ("Products 1 & 3") and Test 2 comprised of ("Products 1 & 2"). Product 2 comprised of 100% PEG 8000 particles while Product 3 was PEG 8000 and spore particles (Evozyme® P500 BS7, Genesis Biosciences, Cardiff) and finished product (FP) contained 0.01% spores powder equivalent to 100 ppm corresponding to $1.0 \times 10^8$ total CFUs of the *Bacillus* spores. Product 3 was a single ingredient made of 100% PEG 8000) used as a control and contained no spores. TABLE 1 below shows the six (6) two combinations tests, product description, test type, wash conditions and Through-the-Wash (TTW) concentration used in each test.

Regular, Cold and Quick Malodor Fabrics

Fabrics with intense malodors were all sourced form J&R Coordinating Services Inc, Cincinnati Ohio. One bath towel, one polyester t-shirt, and one cotton t-shirt with noticeable malodor were cut into swatches and washed together in six (6) different Whirlpool Duet HT Front Loaders washing machines. Two sets of Front Loaders washing machines (one for the test and the second one for the control) were used the 3 sets of wash conditions 1) cold water 60° F./quick wash-25 min, 2) cold water 60° F./regular wash-40 min, and 3) hot water 86° F./regular wash-40 min) for each test corresponding the product combinations to deliver through the wash concentration shown in Table 1.

Malodor Rebloom

The fabric swatches were dried in Kenmore 80 Series Heavy Duty Dryers on high heat setting for 45 minutes and placed individually in sealed sterile plastic cups overnight for 24, 48, 96 and 168 hr point malodor assessments. Prior to olfactive assessment of malodor, the fabric swatches in the plastic cups were rebloomed by spraying wet with deionized water equivalent to 33% of fabric weight in the cup then incubated at 37° C. for 1 hr. Then, fabric swatches in the plastic cups were rebloomed by spraying with deionized water equivalent to 33% of the fabric swatches weight in each cup to equilibrate at room temperature before assessment. The volunteer judges were selected from those familiar with malodor and were asked to rank order fabrics with low to high malodor. In total for 8 judges there were 96 samples pre-prepared. After assessment, the fabric swatches were left in the cup at ambient temperature for another 24 hrs before second, third and fourth assessments at 48, 96, and 168 hr time points. The swatches were incubated in sealed cups at 37° C. for 1 hr to saturate the headspace then allowed equilibrate at room temperature before malodor assessment at 24, 48, 96 and 168 hr time points.

TABLE 2, below, shows the result of this testing with corresponding to the malodor ranking from low malodor to the highest malodor on a malodor scale of 1-10 whereby, 1=low malodor to 10=highest malodors for all six (6) tests over different time points. As can be seen from the overall ranking, the fabric swatches in Test 2 (Inventive 1) and Test 4 (Inventive 2) both in cold water treatment/wash but in quick and regular wash, respectively were determined to be with the lowest malodor compared to the rest of the treatments/washes. Both Test 1 and Test 3 contained no spores and performed the worst as negative control for cold and quick wash (Test 1) and cold and regular wash (Test 3), respectively.

Example 2: Rebloomed Malodor Reduction

TABLE 2

| | Rebloomed Malodor Score: 0 = No Malodor, 10 = Highest) | | | | Overall |
|---|---|---|---|---|---|
| Time point | 24 hr | 48 hr | 96 hr | 168 hr | Ranking |
| Test 1: Cold Water Quick | 7.5 | 6.3 | 8.3 | 7.5 | 7.4 |
| Test 2: Cold Water Quick (Inventive 1) | 3.3 | 5.0 | 3.8 | 3.3 | 3.9 |
| Test 3: Cold Water Regular | 7.5 | 10.0 | 7.5 | 7.5 | 8.1 |
| Test 4: Cold Water Regular (Inventive 2) | 4.2 | 2.5 | 5.0 | 3.3 | 3.8 |
| Test 5: Hot Water Regular | 4.2 | 4.2 | 3.3 | 5.0 | 4.2 |
| Test 6: Hot Water Regular | 5.0 | 4.2 | 5.0 | 5.0 | 4.8 |

Malodor assessment: A total of 8 volunteer judges familiar with fabric malodor were asked assess fabrics malodor from low to high and the ranking was normalized on a malodor scale (1 = low malodor, to 10 = Highest malodor)

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of treating a fabric in a washing machine, the method comprising contacting the fabric with a treatment liquor in the washing machine using a cold program, wherein:

the treatment liquor comprises from about $1\times10^2$ to about $1\times10^8$ CFU/l of treatment liquor of bacterial spores; and the cold program comprises a wash having a bath temperature below 22° C.

2. A method according to claim 1 wherein the cold program comprises a wash lasting about 15 minutes or less.

3. A method according to claim 1 wherein the cold program lasts about 60 minutes or less.

4. A method according to claim 1 wherein the cold program uses less than 65 liters of water.

5. A method according to claim 1 wherein the bacterial spores comprise *Bacillus* spores, selected from the group consisting of *Bacillus subtilis, Bacillus amyloliquefaciens, Bacillus licheniformis, Bacillus megaterium, Bacillus pumilus, Bacillus cereus, Bacillus thuringiensis, Bacillus mycoides, Bacillus tequilensis, Bacillus vallismortis, Bacillus mojavensis* and mixtures thereof.

6. A method according to claim 1 wherein the bacterial spores comprise *Bacillus* spores comprising *Bacillus subtilis, Bacillus amyloliquefaciens, Bacillus licheniformis, Bacillus megaterium, Bacillus pumilus*, or a combination thereof.

7. A method according to claim 1 wherein the cold program comprises a wash cycle and a rinse cycle and wherein the contacting the fabric with the treatment liquor takes place in the wash cycle.

8. A method according to claim 1 further comprising contacting the fabric with a cleansing composition.

9. A method according to claim 8 wherein the cleaning composition comprises a surfactant system and an adjunct comprising one or more of additional enzymes, peroxy compounds, bleach activators, anti-redeposition agents, neutralizers, optical brighteners, foam inhibitors, chelators, bittering agents, dye transfer inhibitors, soil release agents, water softeners, electrolytes, pH regulators, anti-graying agents, anti-crease components, bleach agents, colorants, scents, or processing aids.

10. The method according to claim 9, wherein the surfactant system comprises a surfactant comprising at least one of an anionic surfactant, nonionic surfactant, cationic surfactant, zwitterionic surfactants, amphoteric surfactant, and ampholytic surfactant.

11. The method according to claim 9, wherein the surfactant system comprises an anionic surfactant comprising at least one of: linear alkylbenzenesulfonate (LAS), alpha-olefinsulfonate (AOS), alkyl sulfate (fatty alcohol sulfate) (AS), alcohol ethoxysulfate (AEOS or AES), secondary alkanesulfonates (SAS), alpha-sulfo fatty acid methyl esters, and alkyl- or alkenylsuccinic acid.

12. A method according to claim 8 wherein the cleaning composition is in the form of a liquid composition, a granular composition, a single-compartment pouch, a multi-compartment pouch, or a combination thereof.

13. A method according to claim 8 wherein the cold program comprises a wash cycle and a rinse cycle and the treatment liquor is formed by delivering an additive composition to the wash cycle or to the rinse cycle.

14. A method according to claim 13 wherein the additive composition is in the form of a sheet, a pastille, bead, a fibrous article, a tablet, a bar, or a flake.

15. A method according to claim 13 wherein the additive composition is in the form of a pastille or bead comprising polyethylene glycol as a carrier wherein the polyethylene glycol has a weight average molecular weight of from about 5,000 to about 15,000 Daltons.

16. A method according to claim 8, wherein the cold program comprises a wash cycle and a rinse cycle and the treatment liquor is formed by delivering an additive composition to the rinse cycle.

17. The method of claim 1, wherein the fabric first contacts the treatment liquor in the washing machine during the cold program.

18. The method according to claim 1, wherein the bath temperature of the cold program is below about 16° C.

* * * * *